United States Patent [19]

Mashimo

[11] Patent Number: 4,712,624

[45] Date of Patent: Dec. 15, 1987

[54] ROCK DRILL WITH TUNNEL PROFILE CONTROL SYSTEM

[75] Inventor: Toru Mashimo, Higashihiroshima, Japan

[73] Assignee: Mazda Motor Corporation, Hiroshima, Japan

[21] Appl. No.: 903,252

[22] Filed: Sep. 3, 1986

[30] Foreign Application Priority Data

Sep. 4, 1985 [JP] Japan .................. 60-196307

[51] Int. Cl.$^4$ .............................. E21B 15/04
[52] U.S. Cl. ............................ 173/43; 173/20; 173/39; 33/125 W
[58] Field of Search .............. 173/20, 23, 39, 43, 173/45; 33/125 W

[56] References Cited

U.S. PATENT DOCUMENTS

| | | | |
|---|---|---|---|
| 3,003,239 | 10/1961 | Weidren et al. | 33/125 W X |
| 4,343,367 | 8/1982 | Mashimo | 173/43 |
| 4,499,953 | 2/1985 | Molin | 173/43 |
| 4,586,571 | 5/1986 | Rajakallio et al. | 173/20 X |

FOREIGN PATENT DOCUMENTS 5751518 2/1979 Japan .

Primary Examiner—Paul A. Bell
Assistant Examiner—William Fridie, Jr.
Attorney, Agent, or Firm—Burns, Doane, Swecker & Mathis

[57] ABSTRACT

A rock drill having a tunnel profile control system comprising a boom assembly, a converting unit for converting the position of one of positioning points on an orthogonal coordinate system representative of the transverse section of a tunnel to be driven, into a respective value on a boom coordinate system, a positioning control for positioning the boom means according to a value from the converter unit, an ultrasonic distance measuring instrument mounted on the boom assembly for determining the distance between the position point and a point on the peripheral wall defining the tunnel, and an arithmetic unit which utilizes the distance measured between the positioning point and the point on the peripheral wall defining the tunnel, the direction of travel of ultrasonic waves, and the value of the positioning point to calculate, in terms of a value in the orthogonal coordinate system, a value of a measuring point on the transverse section of the tunnel.

12 Claims, 7 Drawing Figures

ROCK DRILL WITH TUNNEL PROFILE CONTROL SYSTEM

BACKGROUND OF THE INVENTION

The present invention relates to a rock drill and, more particularly, to a rock drill equipped with a tunnel profile control system.

In driving a tunnel, it is known to use an apparatus for automatically drilling blastholes. For example, Japanese Patent Publication No. 57-51518, first published Feb. 5, 1979, in the form of a laid-open version, discloses a rock drill mounted on a boom assembly, wherein during the drilling operation the position and the direction of each drilling point in an orthogonal coordinate system projected parallel to the tunnel face is converted into a value on a boom coordinate system for the boom assembly so that the position of the boom assembly can be controlled according to the value on the boom coordinate system before the actual drilling is performed in reference to a predetermined blasthole pattern.

The position and the direction of each blasthole are determined in consideration of the geological features of the ground to be excavated and other factors, and however, it often happens that after the actual blasting, the tunnel would be driven having its transverse sectional profile deviating from the designed profile. One of the major reasons for the deviation from the designed profile is the presence of rocks of varying hardness. Once the tunnel ceiling has been excessively excavated, a correspondingly increased amount of concrete is required for the tunnel lining, and on the other hand, extra excavation is required to form the designed tunnel ceiling.

Where the tunnel excavation is continued even though the transverse sectional profile of the tunnel being driven has deviated from the designed profile, without any corrective measures taken in such a way as to alter the blasthole pattern, it is obvious that the transverse sectional profile of the tunnel being driven is further deviated unless a favorable change in the nature of the rock being excavated is encountered. Successive deviation in transverse sectional profile of the tunnel being driven eventually results in the necessity of the increased amount of concrete for the tunnel lining; the longer the tunnel to be driven, the greater the amount. It also eventually results in the necessity of extra excavation work to be done.

In contrast to the prior art technique, it can be contemplated to minimize the deviation in tunnel sectional profile by surveying the tunnel sectional profile each time a cycle of excavating work completes, determining the geological difference of the material, through which the tunnel is being driven, in light of the magnitude of deviation measured from the designed sectional profile, and altering, on the basis of the determination, one or both of the designed blasthole pattern and the amount of explosives to be charged into the blastholes for the subsequent cycle of excavating work. However, where the tunnel to be driven has a large sectional profile, the profile survey cannot be accurately performed without difficulty, and, if possible with the use of a separate measuring apparatus specially designed only for the profile survey, the measuring apparatus must be of such a size and/or bulkiness that it will not disturb the freedom of movement of the automatic rock drill apparatus.

SUMMARY OF THE INVENTION

The present invention has, accordingly, for its essential object to provide an improved version of the above described automatic rock drill wherein a tunnel profile control system is provided for the easy and exact measurement of the transverse sectional profile of the tunnel being driven.

In order to accomplish this object of the present invention, there is provided a rock drill having a tunnel profile control system which comprises a boom means on which a rock drill is mounted, a converter means for converting the position of any one of a plurality of positioning points, projected on an orthogonal coordinate system representative of the transverse section of a tunnel to be driven, into a respective value on a boom coordinate system, a positioning control means for positioning the boom means according to a value fed from the converter means, an ultrasonic generator-and-receiver for determining the distance between the positioning point and a point on the peripheral wall defining the tunnel, and an arithmetic means which utilizes the distance measured between the positioning point and the on the peripheral wall defining the tunnel, the direction of travel of ultrasonic waves generated and received by the ultrasonic generator-and-receiver, and the value of the positioning point to calculate, in terms of a value in the orthogonal coordinate system, a value of a measuring point on the transverse section of the tunnel.

In the system of the present invention, since the sectional profile of the tunnel being driven is surveyed by moving the boom assembly having the rock drill mounted thereon, it is sufficient to advance towards the tunnel face after the blasting the boom assembly which has been used during the previous drilling operation. Moreover, since the distance measurement is performed while the ultrasonic distance measuring means has been positioned close towards the peripheral wall defining the tunnel, not only can any possible measurement error which would occur under the influence of dust and ground particles be avoided, but any irregularity in spacing between the neighboring measuring points can also be avoided.

BRIEF DESCRIPTION OF THE DRAWINGS

This and other objects and features of the present invention can be understood from the following description taken in conjunction with the preferred embodiment thereof with reference to the accompanying drawings, in which.

DETAILED DESCRIPTION OF THE EMBODIMENT

Figure 1:
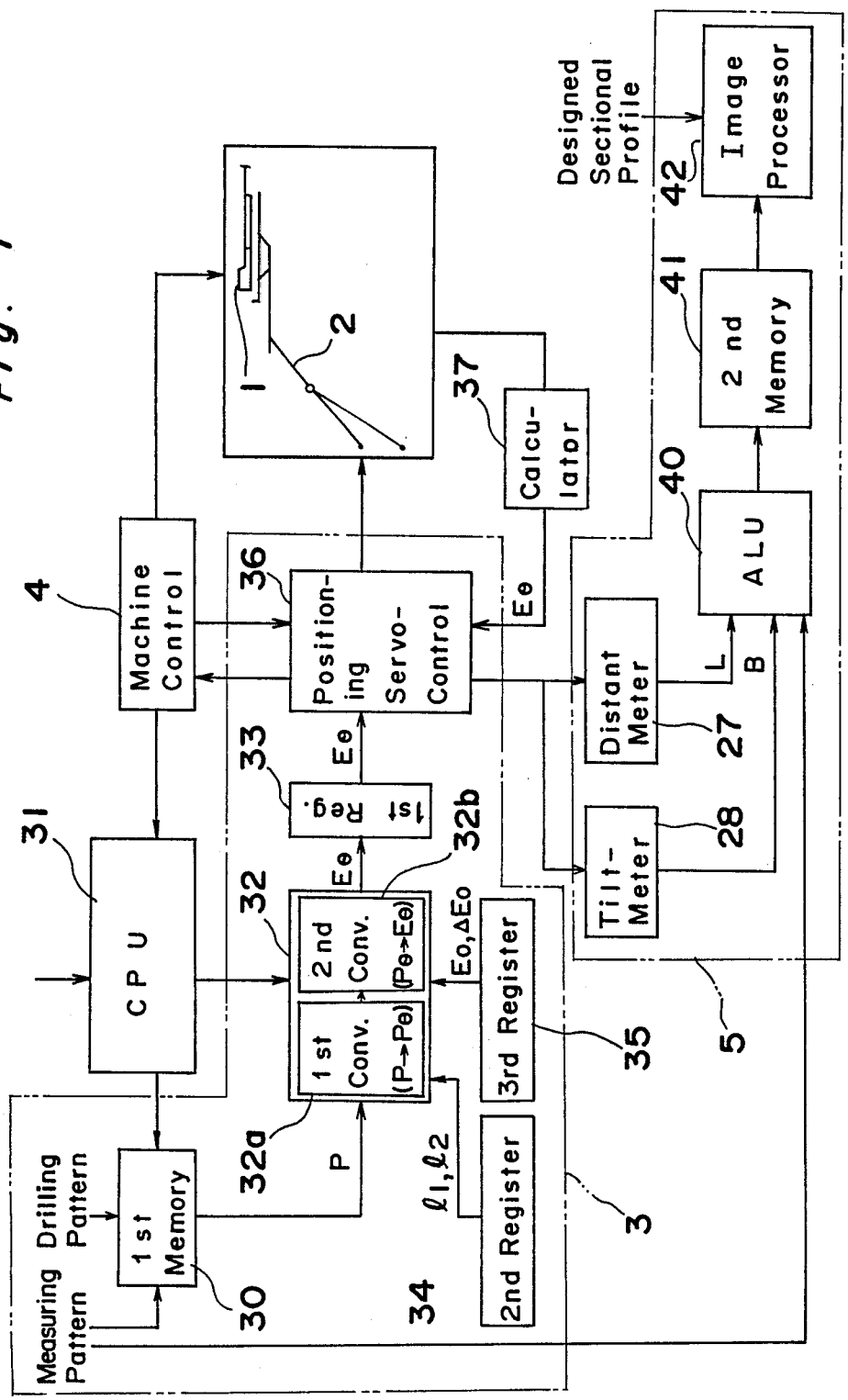
FIG. 1 is a block circuit diagram showing a tunnel profile control system according to the present invention.

Referring first to FIG. 1, the rock drill system embodying the present invention comprises a boom positioning control system 3 for providing with a boom assembly 2 for the support of a rock drill 1 a boom control amount according to a drilling pattern and a measuring pattern so that the boom assembly 2 can be positioned, a machine control unit 4 for driving the rock drill 1 to perform a drilling operation incident to the positioning to a drilling point, and a profile survey system 5 for measuring the transverse sectional profile of the tunnel and performing related processes incident to the positioning to a positioning point.

Figure 2:
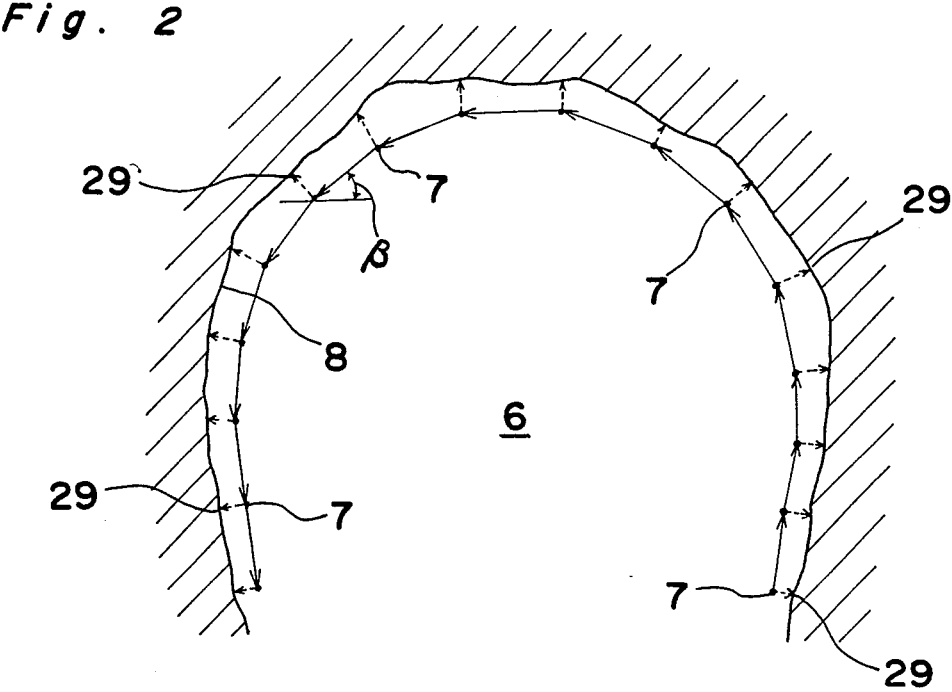
FIG. 2 is a transverse sectional view of a tunnel showing a pattern of measuring points.

In this instance, the drilling pattern lies in the imaginary drilling plane represented by an orthogonal coordinate system lying in front of the tunnel face, whereas the measuring pattern lies, as shown in FIG. 2, a transverse sectional profile of the tunnel represented also by an orthogonal coordinate system lying inside the tunnel 6 and in front of the tunnel face. In other words, each of positioning points 7 in the measuring pattern lies at a location spaced an approximately equal distance from a peripheral wall 8 defining the tunnel. These positioning points 7 may be substituted by drilling points in the tunnel face which are located closest to the peripheral wall 8 defining the tunnel.

Figure 3:
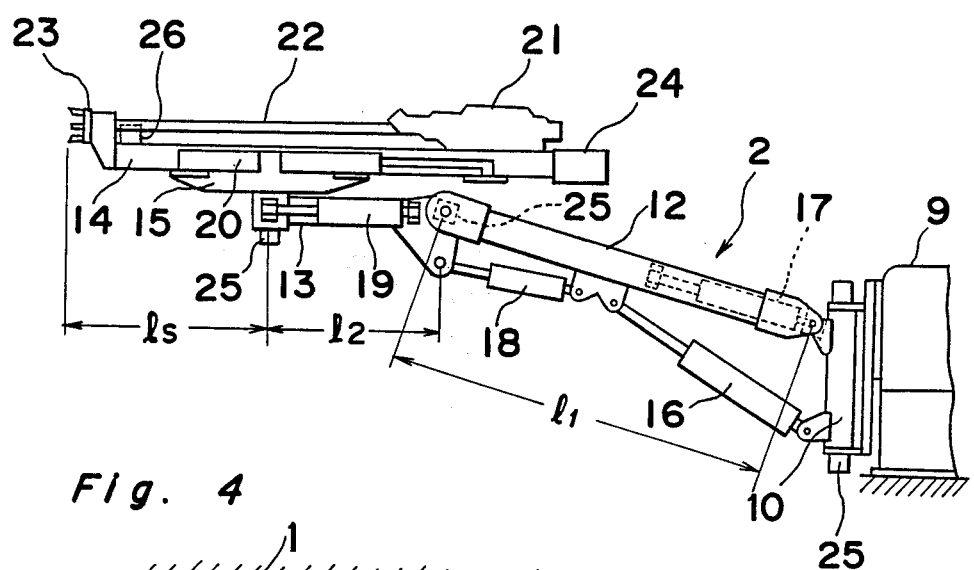
FIG. 3 is a schematic side view of a boom assembly for the support of a rock drill.
Figure 4:
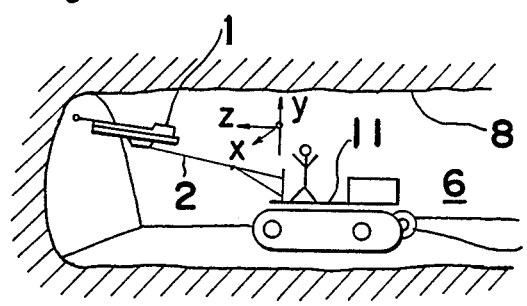
FIG. 4 is a schematic diagram showing the tunnel being driven.

More specifically, and referring to FIG. 3, reference numeral 9 represents a circular mounted on a crawler carrier 11 (FIG. 4) for rotation about an axis lying horizontally. This circular 9 carries an upright rotary shaft 10 mounted thereon so as to extend perpendicular to the horizontal axis about which the circular 9 rotates. The boom assembly 2 comprises a first boom 12 pivotally connected at one end with the upright shaft 10 for movement in a first parallel to and containing the longitudinal axis of the shaft 10, a second boom 13 pivotally connected at one end with the other end of the first boom 12 remote from the upright shaft 10 for movement in the same plane as the first plane in which the first boom 12 pivots, and a guide cell 14 mounted on the second boom 13 through a cell mounting 15, said guide cell 14 supporting thereon a rock drill 1.

The boom assembly 2 also comprises a boom lift cylinder 16 operatively interposed between the upright shaft 10 and the first boom 12 for pivoting the first boom 12 in the first plane parallel to and containing the longitudinal axis of the shaft 10, a boom swing cylinder 17 operatively interposed between the circular 9 and the first boom 12 for pivoting or swinging the first boom 12 about the shaft 10 together with the second boom 13, a cell lift cylinder 18 operatively connected between the first and second booms 12 and 13 for pivoting the second boom 13 in the same plane as the first plane, a cell swing cylinder 19 operatively interposed between the second boom 13 and the guide cell 14 for swinging the guide cell 14 in a plane perpendicular to the plane in which the second boom 13 pivots, and a cell drive cylinder 20 operatively interposed between the cell mounting 15 and the guide cell 14 for driving the guide cell 14 for driving the guide cell between projected and retracted positions in a direction axially thereof.

The rock drill 1 includes a drilling rod 22 having a rear end coupled with a drifter 21 and a front end portion supported by a centralizer 23, said drifter 21 being capable of being selectively advanced and retracted along the guide cell 14 by a feed motor 24 that is mounted on a rear end of the guide cell 14.

Hereinafter, the relationship between the position and direction of the boom front (i.e., the front end of the guide cell 14) which displaced according to the motion of the circular and the various cylinders 16 to 20 and a boom coordinate system will be described with particular reference to FIGS. 5(a) and 5(b).

Figure 5A:
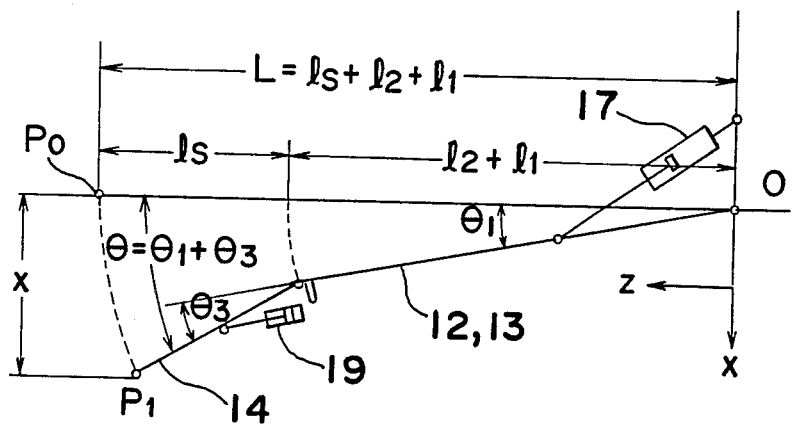
FIGS. 5(a) and 5(b) are diagrams showing displacement of the boom assembly in horizontal and vertical planes, respectively.
Figure 5B:
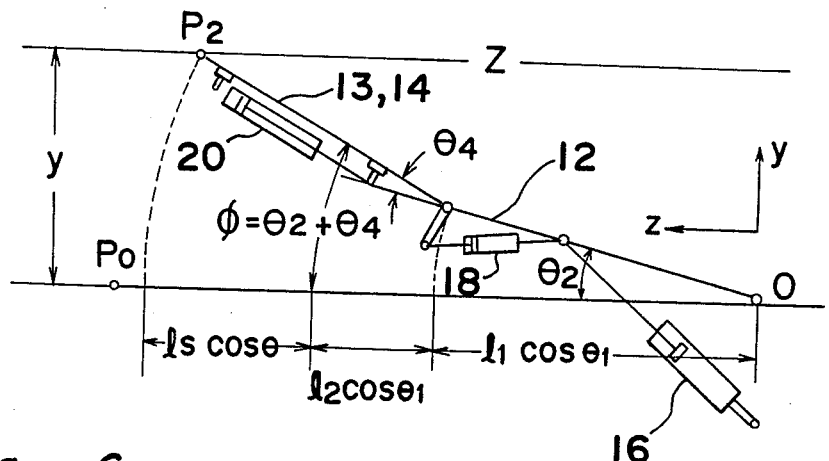

Assuming that the boom assembly having the boom front initially held at a point P0 lying on the X-axis is swung in an X-Z plane containing both the X-axis and the Z-axis to bring the boom front to a point P1 as shown in FIG. 5(a) and is subsequently lifted in a plane parallel to the Y-Z plane containing both the Y-axis and the Z-axis to bring the boom front to a point P2 as shown in FIG. 5(b), the position and direction of the point P2 represented by the orthogonal coordinate system $P(x, y, z, \theta, \phi)$ can be expressed by the following equations if the boom coordinate system $P\theta(\theta_1 \sim \theta_4, l_s)$ is used.

$$x = l_1 \sin\theta_1 \cos\theta_2 + \{l_2 \sin\theta_1 l_s \sin(\theta_1 + \theta_3)\} \cos(\theta_2 + \theta_4)$$

$$y = l_1 \cos\theta_1 \sin\theta_2 + \{l_2 \cos\theta_1 + l_s \cos(\theta_1 + \theta_3)\} \sin(\theta_2 + \theta_4)$$

$$z = l_1 \cos\theta_1 \cos\theta_2 + \{l_2 \cos\theta_1 + l_s \cos(\theta_1 + \theta_3)\} \cos(\theta_2 + \theta_4)$$

$$\theta = \theta_1 + \theta_3$$

$$\phi = \theta_2 + \theta_4$$

wherein $l_1$ and $l_2$ represent the respective lengths of the first and second booms 12 and 13, and $l_s$ represents the distance between the front end of the second boom 13 and the front end of the guide cell 14.

In this example, since the boom assembly 2 can be rotated by the circular 9 about the horizontal axis (Z-axis), values of the position P3 (not shown) of the boom front in the orthogonal coordinate system $P(X, Y, Z, \theta, \Phi)$ after the boom front has been angularly displaced from the point P2 as a result of the rotation of the boom assembly 2 through an angle $\alpha$ about the horizontal axis will now be discussed. In the first place, the position (X, Y, Z) can be expressed by the following equations:

$$X = x \cos\alpha - y \sin\alpha \quad (1)$$

$$Y = x \sin\alpha - y \cos\alpha \quad (2)$$

$$Z = z \quad (3)$$

With respect to the direction ($\Theta$, $\Phi$) of the point P3, since the position and the direction (vector) of the point P2 relative to the point 0 of origin are fixed, a point P'2 spaced an imaginary distance $l_0$ from the point P2 in a direction ($\theta$, $\Phi$) is expressed by the sum of vectors OP2 and P2P2', and a point P'3 resulting from the rotation of the point P'2 through the angle $\alpha$ can also be given by equations similar to the above equations (1), (2) and (3). Accordingly, since the vector OP'3 and the vector OP3 given by the above equations (1), (2) and (3) can be fixed, calculating the difference between these vectors results in that the direction ($\Theta$, $\Phi$) of the point P3 can be expressed by the use of $\theta$, $\phi$ and $\alpha$. In other words, the values of the point P3 in the orthogonal coordinate system $P(X, Y, Z, \Theta, \Phi)$ can be expressed by the use of the boom coordinate system ($\theta_1 \sim \theta_4$, $\alpha$, $l_s$) (although no equation for transformation is herein discussed for the sake of brevity).

Figure 6:
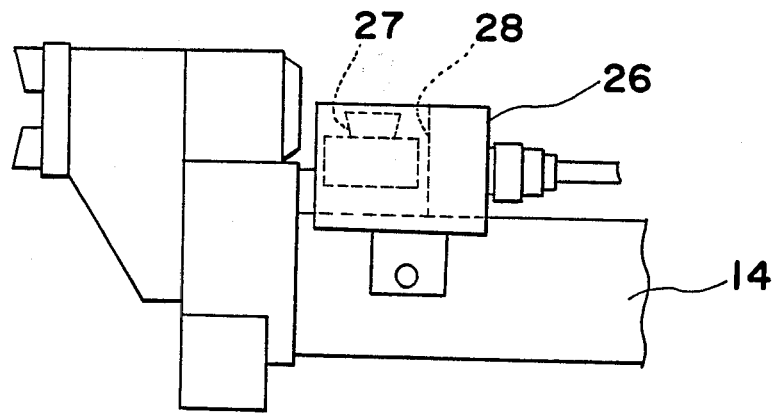
FIG. 6 is a schematic side view, on an enlarged scale, of a front end portion of the rock drill showing a measuring unit mounted thereon.

Referring to FIGS. 3 and 6, the front end of the guide cell 14 has a measuring unit 26 mounted on an upper surface thereof, which unit 26 is used for measuring the minimum distance between each positioning point 7 and the peripheral wall 8 defining the tunnel, that is, the distance 1 between each positioning point 7 and a respective measuring point 29 on the peripheral wall 8 in the transverse sectional profile of the tunnel. As best shown in FIG. 6, the measuring unit 26 comprises an ultrasonic distant meter 27 and a tiltmeter 28. The ultrasonic distant meter 27 includes an ultrasonic generator for generating ultrasonic waves from the upper surface of the guide cell 14 in a direction perpendicular to the latter, and an ultrasonic receiver for receiving the ultrasonic wave which has been reflected, and is operable to measure the distance L from each positioning point 7 to the peripheral wall 8 defining the tunnel in the direction in which the ultrasonic waves are generated and received. The tiltmeter 28 is constituted by a potentiometer for detecting the angle $\beta$ of inclination of the upper surface of the guide cell 14 relative to the horizontal direction, that is, the direction in which the ultrasonic waves are generated and received. Thus, based on the actually measured distance L and the actually measured angle $\alpha\theta$ of inclination, the minimum distance 1 can be calculated as follows:

$$l = L \cos\beta \quad (4)$$

Accordingly, the control of the boom assembly according to the position and direction of the drilling points given by the orthogonal coordinate system and the position of each positioning point can be fundamentally accomplished if a coordinate system converter (P—P$\theta$) and positioning means for the angles $\theta_1 \sim \theta_4$ and $\alpha$ and the length $l_s$ are available. Also, a value of each measuring point 29 on the peripheral wall 8 defining the tunnel can be arithmetically calculated if a value of the associated positioning point 7, the distance L given by ultrasonic distance measurement and the angle $\beta$ of inclination given by the tiltmeter 28 are known. In the illustrated embodiment, in positioning, values in the boom coordinate system are converted into an encoder control amount E$\theta$ corresponding to angles of rotation of the respective booms, and for this purpose, an encoder 25 is installed at each of a pivot joint between the circular 9 and the upright shaft 10, a pivot joint between the first and second booms 12 and 13, and a pivot joint between the second boom 13 and the cell mounting 15 as shown in FIG. 3.

Referring back to FIG. 1, the details of the system shown therein will now be described. The positioning control system 3 includes a first memory means 30 which stores such values in the orthogonal coordinate system P as representing the position and direction of each of a plurality of the drilling points determined according to the drilling pattern on the imaginary drilling plane referred to hereinbefore, and the position of each of a plurality of the positioning points determined according to the measuring pattern on the transverse sectional profile of the tunnel, all of said information having been inputted through the manipulation of a keyboard. This first memory means 30, when receiving a command from a central processing unit 31, feeds to a converting unit 32 values representative of the drilling point and the positioning point.

The converting unit 32 comprises a first converter 32a for converting a value given in the orthogonal coordinate system P into a value on the boom coordinate system P$\theta$ and a second converter 32b for converting the value on the boom coordinate system P$\theta$ into the encoder control amount E$\theta$, and is operable in response to a command from the central processing unit 31 to generate respective values of the drilling point and the positioning point to a first register 33. The first converter 32a is fed from a second register 34 with information of the respective lengths $l_1$ and $l_2$ of the first and second booms 12 and 13, whereas the second converter 32b is fed from a third register 35 with a resolving power $\Delta E0$ at a boom reference angle.

The positioning control system 3 also includes a positioning servo-control unit 36 for taking out from the first register 33 the encoder control amount E$\theta$ related with each drilling point and each positioning point and for actuating the cylinders 16 and 20 of the boom assembly 2. In this case, the encoder control amount E$\theta$ expressed in a hexadecimal number notation is, after having been processed into a binary numbering notation, applied from the positioning servo-control unit 36 to the boom assembly 2, and the value through which the boom assembly 2 has been activated and which is generated from the encoders 25 of the boom assembly 2 is, after having been processed by a calculator 37 from the binary numbering notation, fed back to the positioning servo-control unit 36.

The machine control unit 4 is operable to control the operation of the rock drill 1 mounted on the boom assembly 2. More specifically, the machine control unit 4 is operable in response to a drilling point positioning completion signal, i.e., a signal indicative of the completion of the drilling point positioning, fed from the positioning servo-control unit 36, to cause the rock drill 1 to effect a drilling operation and also operable to apply a drilling completion signal to both the positioning servo-control unit 36 and the central processing unit 31.

In the profile survey system 5, the ultrasonic distant meter 27 and the tiltmeter 28 are operable in response to a positioning completion signal, indicative of the completion of the positioning to the positioning point 7, fed from the positioning servo-control unit 36, to feed data on the measured distance L and angle $\beta$ of inclination to an arithmetic logic unit 40. The arithmetic logic unit 40 which is given in the form of the orthogonal coordinate system P, a position data concerning the positioning point 7 is operable to calculate, from the distance L and the angle $\beta$, the minimum distance 1 from one positioning point 7 to the associated measuring point 29 and then to add this minimum distance 1 to the position data of the positioning point 7 to render the measuring point P to be represented by a value on the orthogonal coordinate system P. The value so calculated of each measuring point 29 is stored in a second memory means 41. The second memory means 41 is in turn connected with an image processor 42 which, after the completion of the tunnel profile measurement at all of the position points 7, takes measurement data out from the second memory means 41 so that the transverse sectional profile of the tunnel can be displayed imagewise for comparison with the designed transverse sectional profile of the tunnel which has been inputted beforehand.

Thus, in the illustrated embodiment, the drilling operation is performed by, based on the drilling pattern, converting the drilling point information into the encoder value Eθ from the value of the orthogonal coordinate system P through the value on the boom coordinate system Pθ, then feeding it to the position servo-control unit 36 through the first register 33 and positioning the boom assembly 2 successively to the drilling points. After the completion of the drilling operation, the explosives are loaded followed by the setting off of the explosives to form the tunnel 6.

Thereafter, the positioning is carried out according to the measuring pattern in a manner similar to that during the drilling operation, the measured value L given by the ultrasonic distant meter 27 is corrected in view of the angle β of inclination, the corrected value is then added to the value representative of the positioning point, and the values of the respective measuring points 29 in the orthogonal coordinate system P are successively stored. After the completion of measurements at all of the positioning points 7, the transverse sectional profile of the tunnel is processed imagewise, and the difference in nature of rock at different locations at the tunnel face is determined from the comparison with the designed transverse sectional profile of the tunnel, so that data can be obtained which can be used in the determination of the drilling pattern for the next succeeding drilling operation and also or the amount of explosives to be loaded. In other words, if a result of examination of the transverse sectional profile of the tunnel actually driven shows that some localities of the peripheral wall 8 remain protruding inwardly of the tunnel with respect to the designed transverse sectional profile, it is an indication that rocks at such localities are hard or the amount of explosives loaded was insufficient. On the other hand, if a result of the examination shows that some localities of the peripheral wall 8 are recessed outwardly of the tunnel with respect to the designed transverse sectional profile, it is an indication that rocks at such localities are soft or the amount of explosives loaded was excessive. Therefore, the data so obtained are used to alter the drilling positions and drilling directions and/or to alter the amount of explosives to be loaded during the next succeeding drilling operation so that the transverse sectional profile of the tunnel actually driven can approach the designed transverse sectional profile of the tunnel desired to be attained.

In describing the foregoing embodiment, it has been shown that, for the purpose of the boom positioning for the profile survey, the circular is utilized to orient towards the side of the tunnel in the direction in which the ultrasonic waves are transmitted and received. However, when the height of the tunnel is desired to be measured, without the circular being utilized, the boom assembly may be so positioned as to permit the direction, in which the ultrasonic waves are transmitted and received, to be oriented upwards. The use of the tiltmeter may be dispensed with if the guide cell can be always positioned so as to assume a horizontal position.

Moreover, the use of the tiltmeter can also be dispensed with if the direction in which the ultrasonic waves are transmitted and received can be calculated from the boom operating amount necessitated to position the boom assembly to any one of the positioning points.

Also, in the foregoing embodiment, two control elements including the first memory means 30 and the converting unit 32 have been shown as incorporated into a single system together with the other control elements including the central processing unit 31. However, the first memory means 30 and the converting unit 32 may be separated from the control systems on the side of the central processing unit 31, that is, may be separated from the crawler carrier 11, in which case arrangement should be made to permit the central processing unit 31 to issue an operating command to the first register 33 where information of the drilling points is stored.

The arithmetic logic unit 40 for the profile measurement shown and described as connected with the front stage of the second memory means 41 with respect to the image processor 42 may be connected between the memory means 41 and the image processor 42 so that, while the distance measured from each positioning point is stored in the memory means 41, this measured distance and the data of the positioning point can be used to determine the value of the measuring point on the tunnel transverse sectional profile with the value of the orthogonal coordinate system before the image processing.

From the foregoing full description of the present invention, it has now become clear that, since the tunnel transverse sectional profile is surveyed by the utilization of the boom assembly having the rock drill mounted thereon, no necessity will arise to use any independent, specially designed measuring instrument and the profile survey can be readily and easily carried out. Also, since the distance measurement is carried out by the use of ultrasonic waves after the boom assembly has been positioned to any one of the position points, the measurement distance can be shortened with the possibility of any erroneous distance measurement consequently minimized, and since each positioning point is determined beforehand, any irregularity in spacing between the neighboring measuring points on the transverse sectional profile of the tunnel can be avoided and, therefore, accurate and reliable measurement data on the tunnel transverse sectional profile can be obtained.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A rock drill having a tunnel profile control system which comprises:

a boom means for the support of a rock drill thereon;

a converter means for converting the position of any one of a plurality of positioning points, projected on an orthogonal coordinate system representative of the transverse section of a tunnel to be driven, into a respective value on a boom coordinate system;

a positioning control means for positioning the boom means according to a value fed from the converter means;

an ultrasonic distance measuring means mounted on the boom means and including an ultrasonic generator-and-receiver for determining the distance between the position point and a point on the peripheral wall defining the tunnel; and an arithmetic means which utilizes the distance determined by the ultrasonic distance measuring means, the direction of travel of ultrasonic waves generated and received by the ultrasonic generator-and-receiver and the value of the positioning point to calculate, in terms of a value in the orthogonal coordinate system, a value of a measuring point on the transverse section of the tunnel.

2. The rock drill as claimed in claim 1, further comprising an encoder installed at each of articulated joints in the boom means.

3. The rock drill as claimed in claim 2, wherein the converter means comprises a first converter for converting a value given in the orthogonal coordinate system into a value on the boom coordinate system, and a second converter for converting the value on the boom coordinate system into a control amount of the encoder.

4. The rock drill as claimed in claim 1, wherein the boom means is, when the height of the tunnel is to be measured, so positioned as to orient upwards the direction of travel of the ultrasonic waves generated and received by the ultrasonic generator-and-receiver.

5. The rock drill as claimed in claim 1, wherein the boom means includes a guide cell always positioned horizontally when the height of the tunnel is to be measured.

6. The rock drill as claimed in claim 1, wherein the ultrasonic distance measuring means comprises an ultrasonic distant meter and a tiltmeter.

7. The rock drill as claimed in claim 6, wherein the ultrasonic distant meter includes a generator for generating ultrasonic waves towards a measuring plane and a receiver for receiving the ultrasonic waves reflected from the measuring plane.

8. The rock drill as claimed in claim 6, wherein the tiltmeter is a potentiometer capable of detecting the direction of travel of the ultrasonic waves generated and received.

9. The rock drill as claimed in claim 1, further comprising a first memory means for storing such values in the orthogonal coordinate system as representing the position and direction of each of a plurality of drilling points determined according to a drilling pattern on an imaginary drilling plane, and the position of a plurality of positioning points determined according to a measuring pattern on the transverse sectional profile of the tunnel.

10. The rock drill as claimed in claim 9, wherein the converter means and the first memory means are provided separate from a self-propelled service vehicle.

11. The rock drill as claimed in claim 1, further comprising a second memory means for storing values of the respective measuring points calculated by the arithmetic means.

12. The rock drill as claimed in claim 11, wherein the second memory means is connected with a front stage of the arithmetic unit.

* * * * *